(12) United States Patent
Kanno et al.

(10) Patent No.: US 6,980,309 B2
(45) Date of Patent: Dec. 27, 2005

(54) IMAGE PROCESSING APPARATUS AND IMAGE PROCESSING METHOD

(75) Inventors: Hiroki Kanno, Yokohama (JP); Gaku Takano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,172

(22) Filed: May 19, 1999

(65) Prior Publication Data

US 2003/0067636 A1    Apr. 10, 2003

(30) Foreign Application Priority Data

May 28, 1998  (JP) ................................ 10-147737

(51) Int. Cl.$^7$ ............................................... H04N 1/00
(52) U.S. Cl. ...................... 358/1.15; 358/401; 358/434
(58) Field of Search ................................ 358/1.15, 1.1, 358/1.16, 1.13, 1.2, 400, 468, 442, 402, 401, 358/434, 435–440

(56) References Cited

U.S. PATENT DOCUMENTS

| | | | | |
|---|---|---|---|---|
| 5,361,141 A | * | 11/1994 | Aoyama ...................... 358/452 |
| 5,475,475 A | * | 12/1995 | Kohtani et al. ............. 355/244 |
| 5,506,697 A | * | 4/1996 | Li et al. ...................... 358/448 |
| 5,659,164 A | * | 8/1997 | Schmid et al. .............. 235/375 |
| 5,659,770 A | * | 8/1997 | Yamada ....................... 395/792 |
| 5,694,486 A | * | 12/1997 | Shigeeda et al. ........... 382/197 |
| 5,818,966 A | * | 10/1998 | Prasad et al. ............... 382/232 |
| 5,822,507 A | * | 10/1998 | Uda et al. ................... 395/114 |
| 5,844,693 A | * | 12/1998 | Miyata ........................ 358/448 |
| 5,940,121 A | * | 8/1999 | Mcintyre et al. ............. 348/64 |
| 5,966,553 A | * | 10/1999 | Nishitani et al. ........... 396/303 |
| 6,157,436 A | * | 12/2000 | Cok ............................. 355/40 |
| 6,176,427 B1 | * | 1/2001 | Antognini et al. .......... 235/454 |
| 6,185,000 B1 | * | 2/2001 | Shiota et al. .............. 358/1.18 |
| 6,636,332 B1 | * | 10/2003 | Soscia ........................ 358/401 |
| 2001/0019416 A1 | * | 9/2001 | Monty et al. ................ 358/1.9 |

OTHER PUBLICATIONS

Van, David, "How to Check and Correct Color Proofs," Quarto Publishing, Inc. (1990).

* cited by examiner

*Primary Examiner*—Joseph R. Pokrzywa
(74) *Attorney, Agent, or Firm*—Foley & Lardner LLP

(57) ABSTRACT

An image producing section produces a character or pattern image indicative of the input conditions of a color scanner section. The input conditions include data on the resolution, the sampling rate, etc. An image synthesis section synthesizes the produced image with an image scanned by the color scanner section and subjected to predetermined image processing. The resultant synthesized image is printed out by a color printer section. The operating conditions, such as the image input conditions, are clear from the character or pattern image printed out as part of the synthesized image.

4 Claims, 10 Drawing Sheets

```
┌─────────────────────────────────────────────────┐ P1
│  RESOLUTION 400dpi, CARRIAGE SPEED 50%,         │
│  SAMPLING 100%                                  │
└─────────────────────────────────────────────────┘
```
FIG. 6A
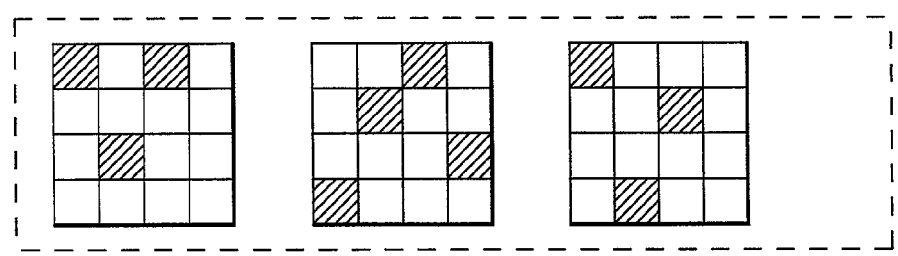
FIG. 6B
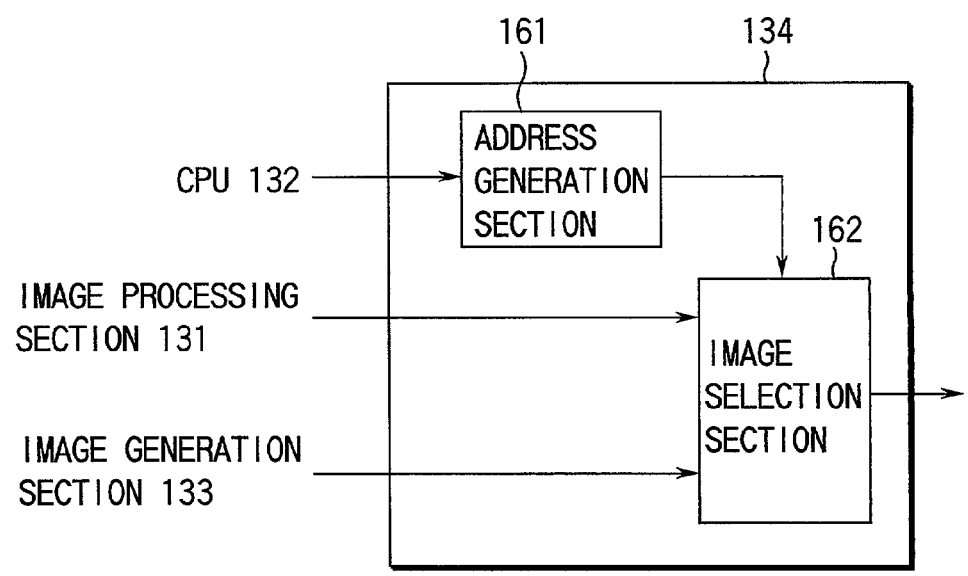
FIG. 7

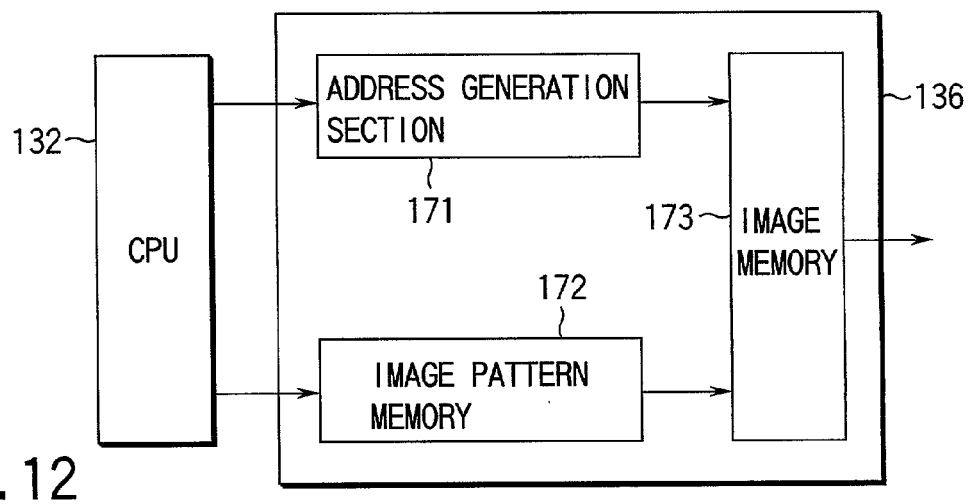
FIG. 12
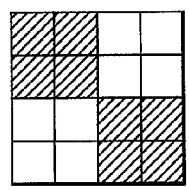   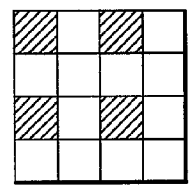   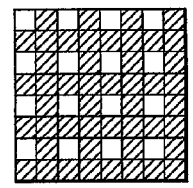
FIG. 13A    FIG. 13B    FIG. 13C
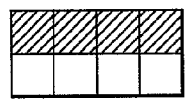   
FIG. 13D    FIG. 13E
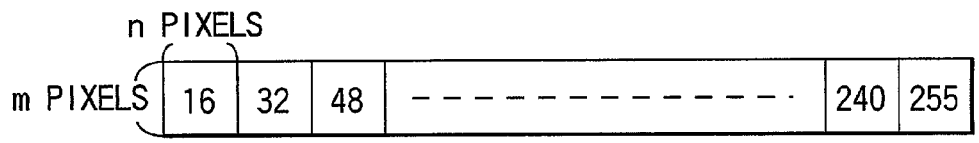
FIG. 14

| IDENTIFICATION CODE | COLOR CONVERSION | SPATIAL FILTERING | ------- |
|---|---|---|---|
| 00001 | PARAMETER A | PARAMETER a | |
| 00002 | PARAMETER B | PARAMETER a | |
| 00003 | PARAMETER B | PARAMETER b | |
| ⋮ | ⋮ | ⋮ | |

FIG. 17

IDENTIFICATION CODE INPUT SETTING

CODE

| 00001 |

| SETTING |

FIG. 18

IMAGE PROCESSING APPARATUS AND IMAGE PROCESSING METHOD

BACKGROUND OF THE INVENTION

The present invention relates to an image processing apparatus for scanning a color or monochrome image on a document and making a copy of the image, such as a digital color/monochrome copying machine.

In general, what is important for this type of copying machine is the image quality.

Heretofore, if the quality of the image the copying machine makes is poor, the user calls a serviceperson to have the copying machine repaired. The serviceperson relies on his or her own experience to locate the section (the scanner section, the image processing section, or the printer section) that causes the degradation of the image quality. Sometimes, it is not easy for the serviceperson to locate the cause of the degradation. In such a case, it may be necessary to output a copy of an image again and again, using consumables, such as paper and toner, in large quantities. In addition, a long time is required for the check, increasing the service cost.

BRIEF SUMMARY OF THE INVENTION

One object of the present invention is to provide an image processing apparatus and an image processing method that enable the serviceperson to locate the cause of image quality degradation without relying on his or her experience.

Another object of the invention is to provide an image processing apparatus and an image processing method which eliminate the need to repeatedly output a copy of an image for the location of the cause of the image quality degradation, thereby reducing the quantities in which consumables, such as paper and toner, are used, and which enable the check to be executed within a short time, thereby minimizing the service cost.

According to the present invention, when a scanned document image is output or printed, characters or identification patterns that represent the operating conditions of the present apparatus are synthesized with the scanned document image and printed also. The operating conditions include image input conditions of the scanner, the conditions under which the scanned image is processed, the conditions under which the image is printed, etc. Even if images are output under different operating conditions, the operating conditions corresponding to each image are clear.

A mode designating section is provided to switch the operating modes. That is, it is possible to choose whether the image synthesis should be performed or not and to choose whether image processing parameters should be stored or not. In addition, it is possible to select the mode in which the user can enter identification codes, so that an image is processed and output under the image processing parameters corresponding to the entered identification codes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B show examples of images representing the scanner input conditions and generated by the image generation section depicted in FIG. 3.

FIG. 7 is a block diagram schematically showing the image synthesis section depicted in FIG. 3.

FIG. 12 is a block diagram schematically showing the image synthesis section depicted in FIG. 10.

FIGS. 13A through 13E show examples of images patterns which are capable of representing the recording characteristics of a color printer section and which are generated by the image generation section depicted in FIG. 10.

FIG. 14 shows an example of a gradation pattern which are is capable of representing the gradation characteristics of the color printer section and which is generated by the image generation section depicted in FIG. 10.

FIG. 17 shows examples of identification codes, as which the image generation section depicted in FIG. 16 generates image processing parameters.

FIG. 18 shows how the identification code input section depicted in FIG. 16 operates.

DETAILED DESCRIPTION OF THE INVENTION

Embodiments of the present invention will now be described with reference to the accompanying drawings.

Figure 1:
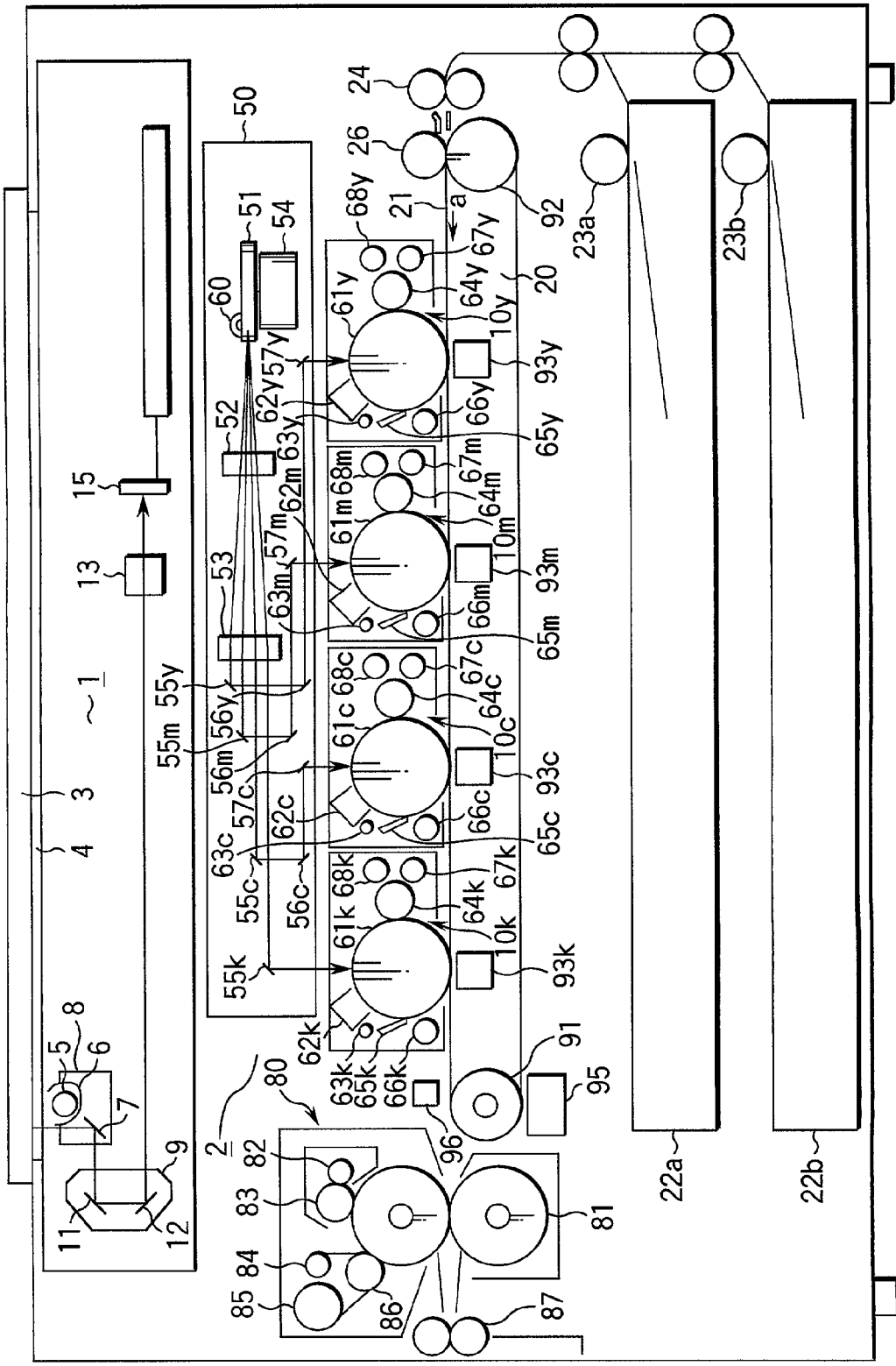
FIG. 1 is a side view schematically showing the internal structure of an image processing apparatus according to one embodiment of the present invention.

FIG. 1 schematically shows the internal structure of an image processing apparatus, which is for example a digital color/monochrome copying machine for scanning a color or monochrome image on a document and making a copy of it. Broadly speaking, the image processing apparatus is made up of a color scanner section 1 for scanning a color image on a document and inputting the scanned image; and a color printer section 2 (i.e., an image output means) for making a copy of the input color image.

The color scanner section 1 comprises a document cover 3 located on top thereof, and a document table 4 which is formed of transparent glass and on which a document is placed. The document table 4 faces the document cover 3 when this cover 3 is in the closed state. Located under the document table 4 are: an exposure lamp 5 for illuminating the document placed on the document table 4; a reflector 6 for guiding the light from the exposure lamp 5 toward the document; and a first mirror 7 for reflecting the reflected light from the document to the left as viewed in FIG. 1. The exposure lamp 5, the reflector 6 and the first mirror 7 are fixed to a first carriage 8. The first carriage 8 is driven by means of a tooted belt and a pulse motor (neither is shown) and is movable in parallel to the document table 4 along the lower surface thereof.

A second carriage 9 is arranged at a position which is to the left of the first carriage 8, as viewed in FIG. 1, i.e. at the position to which the reflected light is guided by the first mirror 7. The second carriage 9 is moved in parallel to the document table 4 by a driving mechanism (not show) including a toothed belt, a DC motor, etc. In the second carriage 9, a second mirror 11 and a third mirror 12 are arranged in such a manner that they form an angle of 90°. The second mirror 11 guides the reflected light from the first mirror 7 downward, while the third mirror 12 guides the reflected light from the second mirror 11 to the right, as viewed in FIG. 1. The second carriage 9 moves in such a manner as to follow the first carriage 8. It is moved along the document table 4 at a speed half that of the first carriage 8.

A focusing lens 13 is arranged in the plane containing both the optical axis of the light guided by the second mirror 11 and that of the light guided by the third mirror 12. The focusing lens 13 focuses the reflected light from the third mirror 13 at a predetermined magnification. A CCD color image sensor (photoelectric conversion element) 15 is arranged in a plane substantially perpendicular to the optical axis of the light which has emerged from the focusing lens 13. The CCD color image sensor 15 converts the reflected light focused by the focusing lens 13 into electric signals.

As can be seen from the above, the reflector 6 guides the light from the exposure lamp 5 to the document placed on the document table 4, and the reflected light from the document is incident on the color image sensor 15 after traveling by way of the first mirror 7, the second mirror 11, the third mirror 12 and the focusing lens 13. By the color image sensor 15, the incident light is converted into electric signals corresponding to the three primary colors, namely red, green and blue.

The color printer section 2 comprises first, second, third and fourth image formation units 10y, 10m, 10c and 10k. These image formation units form a yellow (y) image, a magenta (m) image, a cyan (c) image and a black (k) image, respectively, which are obtained by executing color decomposition based on a known primary color mixing method.

A conveyance mechanism 20 is arranged under the image formation units 10y, 10m, 10c and 10k. The conveyance mechanism 20 includes a conveyance means made of a conveyance belt 21. By this conveyance belt 21, an image of each color formed by each image formation unit is conveyed in the direction indicated by arrow a in FIG. 1. The conveyance belt 21 is stretched between a driving roller 91 and a driven roller 92. The driving roller 91 is rotated in the direction of arrow a by a motor (not shown), while the driven roller 92 is kept away from the driving roller 91 by a predetermined distance. The conveyance belt 21 is made to travel in the direction of arrow a in an endless manner. The image formation units 10y, 10m, 10c and 10k are arranged in series along the traveling path of the conveyance belt 21.

The image formation units 10y, 10m, 10c and 10k include photosensitive drums 61y, 61m, 61c and 61k, respectively.

These drums serve as image bearing members, and are rotated in the same direction in such a manner that their outer circumferences are kept in contact with the conveyance belt 21. The photosensitive drums 61y, 61m, 61c and 61k are rotated by motors (not shown) at a predetermined circumferential speed.

The photosensitive drums 61y, 61m, 61c and 61k are arranged in such a manner that their axes are disposed at regular intervals and are perpendicular to the direction in which an image is conveyed by the conveyance belt 21. In the description below, the direction in which the axes of the photosensitive drums 61y, 61m, 61c and 61k extend will be referred to as a main scanning direction (the second direction), while the direction in which the photosensitive drums 61y, 61m, 61c and 61k rotate, i.e., the direction in which the conveyance belt 21 is rotated (the direction of arrow a in FIG. 1), will be referred to as a sub scanning direction (the first direction).

Around the photosensitive drums 61y, 61m, 61c and 61k, the following structural elements are arranged: charging units 62y, 62m, 62c and 62k serving as charging means and extending in the main scanning direction; discharging units 63y, 63m, 63c and 63k; developing rollers 64y, 64m, 64c and 64k serving as developing means and extending in the main scanning direction; lower agitating rollers 67y, 67m, 67c and 67k; upper agitating rollers 68y, 68m, 68c and 68k; transfer units 93y, 93m, 93c and 93k serving as transfer means and extending in the main scanning direction; cleaning blades 65y, 65m, 65c and 65k extending in the main scanning direction; and residual toner recovery screws 66y, 66m, 66c and 66k. These structural elements are arranged in the rotating directions of the respective photosensitive drums 61, 61m, 61c and 61k in the order mentioned.

The transfer units 93y, 93m, 93c and 93k are arranged at positions at which they sandwich the conveyance belt 21 in cooperation with the corresponding photosensitive drums 61y, 61m, 61c and 61k. In other words, the transfer units 93y, 93m, 93c and 93k are arranged inside the conveyance belt 21. The exposure points by an exposure device 50 are on those portions of the photosensitive drums 61y, 61m, 61c and 61k which are located between the charging units 62y, 62m, 62c and 62k and the developing rollers 64y, 64m, 64c and 64k.

Sheet cassettes 22a and 22b are arranged under the conveyance mechanism 20. Each sheet cassette stores a plurality of sheets P (i.e., image formation media) to each of which the images formed by the image formation units 10y, 10m, 10c and 10k are to be transferred.

Pickup rollers 23a and 23b are arranged at those end portions of the sheet cassettes 22a and 22b which are close to the driven roller 92 described above. By the pickup rollers 23a and 23b, the sheets are take out from the sheet cassettes 22a and 22b one by one. A pair of register rollers 24 are located between the pickup rollers 23a and 23b and the driven roller 92. The register rollers 24 serve to align the leading end of a sheet taken out from the sheet cassettes 22a and 22b with the front end of a y toner image formed on the photosensitive drum 61y of the image formation unit 10y.

The toner images formed on the other photosensitive drums 61y, 61m and 61c are supplied to the respective transfer positions in accordance with the timings at which the sheet P on the conveyance belt 21 is fed.

An adsorption-providing roller 26 is arranged between the register rollers 24 and the image formation unit 10y and in the vicinity of the driven roller 92. To be more specific, the adsorption-providing roller 26 is in contact with the outer circumference of the driven roller 92, with the conveyance belt 21 interposed therebetween. The adsorption-providing roller 26 provides a sheet P with an electrostatic adsorption force when the sheet P comes out from between the register rollers 24 and begins to be conveyed at the predetermined timings. The adsorption-providing roller 26 and the driven roller 92 have their axes parallel to each other.

A positional shift sensor 96 is arranged at one end of the conveyance belt 21 and in the vicinity of the driving roller 91. To be more specific, the positional shift sensor 96 is substantially in contact with the outer circumference of the driving roller 92, with the conveyance belt 21 interposed therebetween. The positional shift sensor 96 is made of a light sensor of either a transmission type or a reflection type.

A conveyance belt cleaning device 95 is arranged at a position downstream of the positional shift sensor 96 and is in contact with the outer circumference of the driving roller 91, with the conveyance belt 21 interposed therebetween. By this device 95, the conveyance belt 21 is cleared of the residual toner and paper dust of the sheet P.

A fixing unit 80 is arranged at a position toward which the sheet P conveyed on the conveyance belt 21 is orientated after being separated from the driving roller 91. The fixing unit 80 heats the sheet P up to a predetermined temperature so as to melt the toner image transferred to the sheet P and to fix the toner image to the sheet P. The fixing unit 80 is made up of a pair of heat rollers 81, oil coating rollers 82 and 83, a web winding roller 84, a web roller 85, a web pressing roller 86, etc. The sheet P is discharged from between a pair of discharge rollers 87 after the toner is fixed to the sheet P.

The exposure device 50 forms electrostatic latent images on the outer circumferences of the photosensitive drums 61y, 61m, 61c and 61k, respectively. The images formed by the exposure device 50 are color-decomposed images. The exposure device 50 comprises a semiconductor laser oscillator 60 whose light emission is controlled on the basis of image data which an image processor 36 (to be described later) generates for each of the colors (Y, M, C, K) by color decomposition. Arranged on the optical path of the semiconductor laser oscillator 60 are: a polygon mirror 51, rotated by a polygon motor 54, for reflecting and scanning a laser beam; and fθ lenses 52 and 53 for correcting the focusing point of the laser beam reflected by the polygon mirror 51. The polygon mirror 51, fθ lens 52 and fθ lens 53 are arranged in this order.

Between fθ lens 53 and the photosensitive drum 61y, 61m, 61c and 61k, first bending mirrors 55y, 55m, 55c and 55k, second bending mirrors 56y, 56m and 56c, and third bending mirrors 57y, 57m and 57c are arranged. The first bending mirror 55y, 55m, 55c and 55k bend the laser beams passing through the fθ lens 53 toward the exposure positions on the photosensitive drums 61y, 61m, 61c and 61k, respectively. The second bending mirrors 56y, 56m and 56c and third bending mirrors 57y, 57m and 57c further bend the laser beams which have been bent by the first bending mirrors 55y, 55m, 55c and 55k.

It should be noted that the laser beam used for forming a black image is guided to the photosensitive drum 61k without being directed to any other mirrors.

Figure 2:
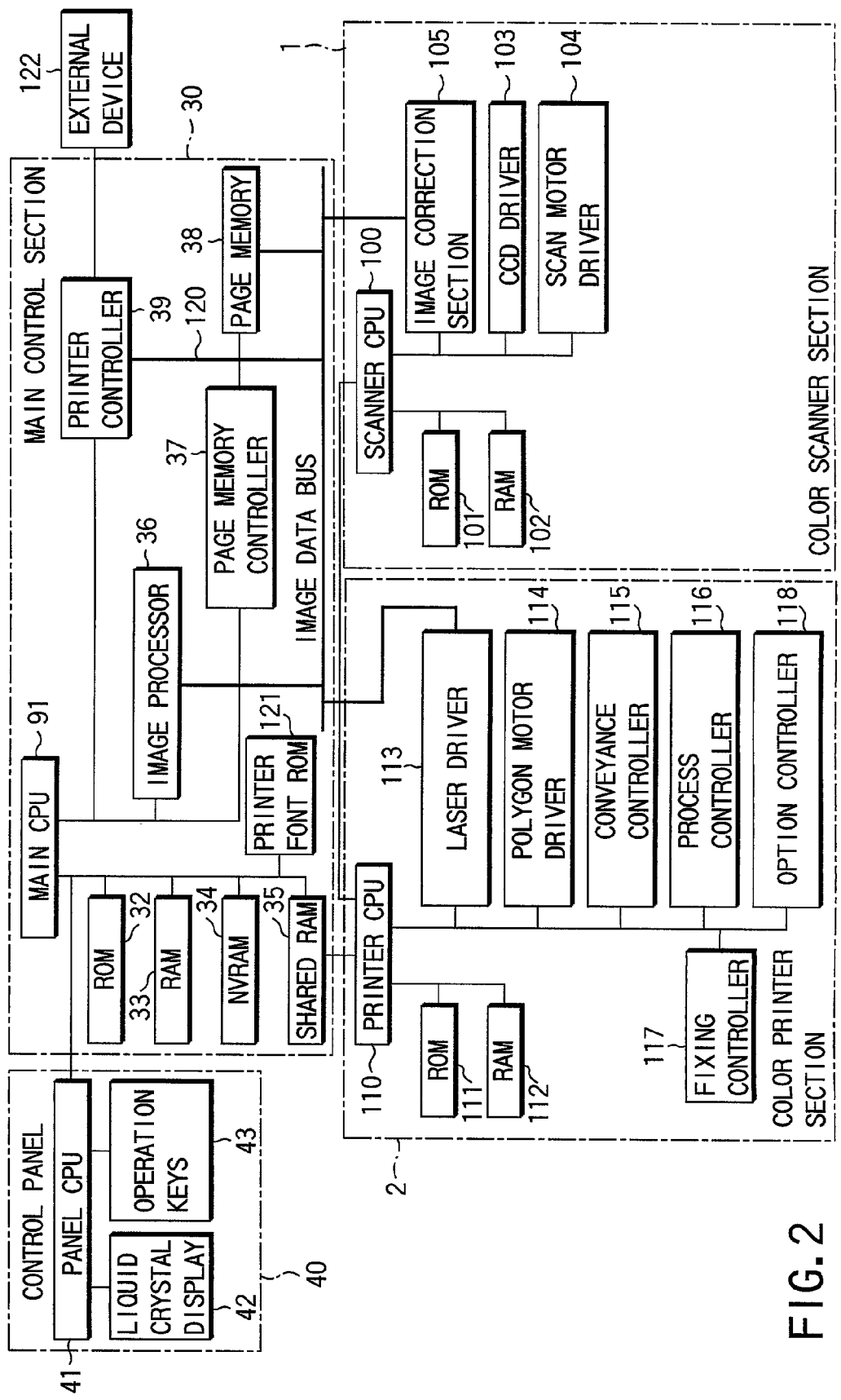
FIG. 2 is a block diagram schematically showing how the sections of the image processing apparatus shown in FIG. 1 are electrically connected and how control signals are supplied.

FIG. 2 is a block diagram schematically showing how the sections of the image processing apparatus shown in FIG. 1 are electrically connected and how control signals are supplied. Referring to FIG. 2, the control system is made up of a main CPU (central processing unit) 91, a scanner CPU 100 and a printer CPU 110, which are arranged in a main control section 30, a color scanner section 1 and a color printer section 2, respectively.

The main CPU 91 performs bothway communications with reference to the printer CPU 110 by way of a shared RAM (random access memory) 35. The main CPU 92 issues an operation command to the printer CPU 110, and the printer CPU 110 sends a status signal back to the main CPU 92. The printer CPU 110 and the scanner CPU 100 perform serial communications with reference to each other. The printer CPU 110 issues an operation command to the scanner CPU 100, and the scanner CPU 100 sends a status signal back to the printer CPU 110.

A control panel 40 comprises a liquid crystal display 42, operation keys 43 of various kinds, and a panel CPU 41 to which the liquid crystal display 42 and operation keys 43 are connected.

In addition to the main CPU 91 and the shared RAM 35, the main control section 30 comprises a ROM (read only memory) 32, a RAM 33, an NVRAM 34, an image processor 36, a page memory controller 37, a page memory 38, a printer controller 39 and a printer font ROM 121.

The main CPU 91 performs overall control. The ROM 32 stores control programs, etc. The RAM 33 is used for temporarily storing data.

The NVRAM 34 is a nonvolatile memory back up by a battery (not shown). The data stored in the NVRAM 34 is not lost when the power supply is turned off.

The shared RAM 35 is used for enabling the main CPU 91 and the printer CPU 110 to perform bothway communications with reference to each other.

The page memory controller 37 records image information in the page memory 38 and reads it out therefrom. The page memory 38 includes an area where image information corresponding to a number of pages can be stored. The page memory 38 receives compressed data of image information from the color scanner section 1 and stores the compressed data in units of one page.

The printer font ROM 121 stores font data corresponding to print data. The printer controller 39 receives print data from an external device 122 (e.g., a personal computer) and develops the print data in the printer font ROM 121 as image data based on the resolution indicated by the resolution data included in the print data. The font data stored in the printer font ROM 121 is used when the print data is developed as image data.

The scanner CPU 100 of the color scanner section 1 performs overall control. In addition to this scanner CPU 100, the color scanner section 1 comprises: a ROM 101 for storing control programs or the like; a RAM 102 for storing data; a CCD driver 103 for driving the color image sensor 15; a scan motor driver 104 for controlling the rotation of a scan motor that drives the first carriage 8, etc; and an image correction section 105.

The image correction section 105 comprises an A/D conversion circuit, a shading correction circuit, a line memory, etc. The A/D conversion circuit converts the R, G and B analog signals output from the color image sensor into digital signals. The shading correction circuit corrects variations in the characteristics of the color image sensor 15. Alternatively, the shading correction circuit corrects variations which the threshold level may undergo relative to the output signals of the color image sensor 15 due to the variations in the ambient temperature. The line memory is used for temporarily storing the signals subjected to the shading correction by the shading correction circuit.

The printer CPU 110 of the color printer section 2 performs overall control. In addition to this printer CPU 110, the color printer section 2 comprises: a ROM 111 for storing control programs or the like; a RAM 112 for storing data; a laser driver 113 for driving the semiconductor laser oscillator 60; a polygon motor driver 114 for driving the polygon motor 54 of the exposure device 50; a conveyance controller 115 for controlling the manner in which sheets P are conveyed by the conveyance mechanism 20; a process controller 116 for controlling the process in which charging, developing and transfer are performed by the charging units, the developing rollers and the transfer units, respectively; a fixing controller 117 for controlling the fixing unit 80; an option controller for controlling options; etc.

The image processor 36, the page memory 38, the printer controller 39, the image correction section 105 and the laser driver 113 are connected together by means of an image data bus 120.

Figure 3:
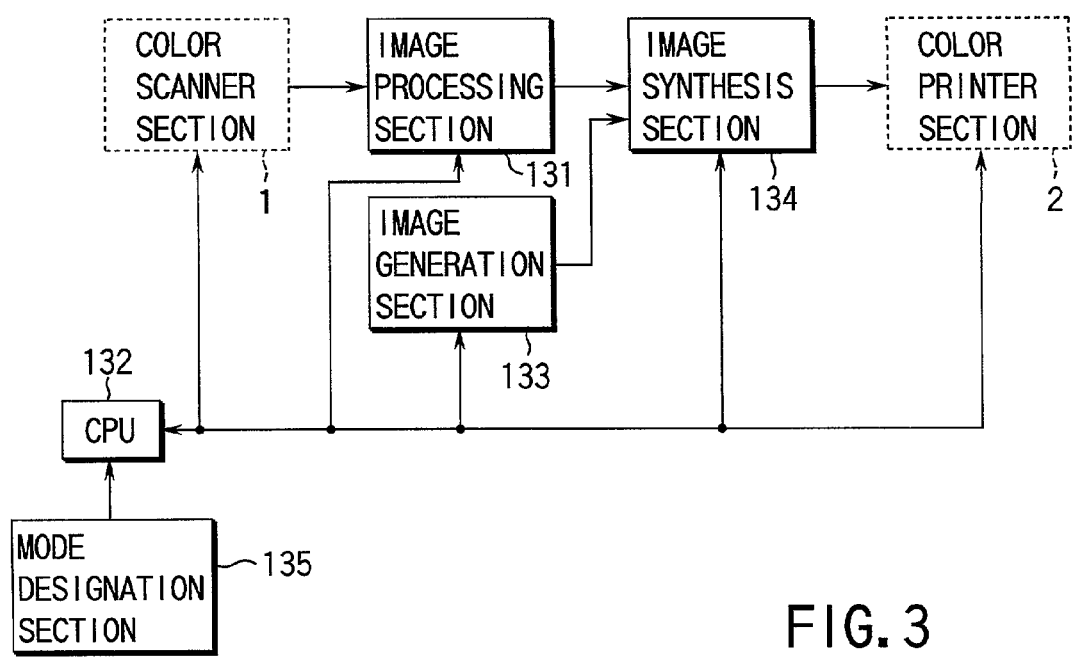
FIG. 3 is a block diagram schematically showing how images are processed in the first embodiment.

FIG. 3 schematically illustrates the image processor 36 employed in the first embodiment.

A schematic structure of the image processor 36 will be first described. Image data R, G and B output from the color scanner section 1 are first supplied to an image processing section 131. The image input conditions of the color scanner section 1 are determined by the CPU 132. The image processing section performs predetermined image processing for the R, G and B image data output from the color scanner section 1.

An image generation section 133 generates an image on the basis of the image input conditions which the CPU 132 determines for the color scanner section 1. An image synthesis section 134 synthesizes an output image of the image processing section 131 with the image generated by the image generation section 133. The resultant synthesized image is supplied to the color printer section 2. The color printer section 2 prints out the synthesized image received from the image synthesis section 134.

By operating a mode designation section 135, the user can designate the operating conditions of the image generation section 133 and the image synthesis section 134.

Each of these structural components will be described in more detail.

The color scanner section 1 scans either a color or monochrome image on a document and generates electric signals corresponding to the three primary colors of R, G and B by means of the CCD color image sensor 15. Then, the electric signals are converted into digital data such that the data on each color of one pixel is comprised of 8 bits. The digital data are output as R, G and B image data (with a resolution of 400 dpi, for example).

As the input conditions of the color scanner section 1, an optical resolution and a read magnification can be set. (For example, the moving speed of the scanner carriages 8 and 9, the sampling timing of outputs from the color image sensor 15, etc. can be determined.) These input conditions are set by the CPU 132. For example, 200 dpi, 300 dpi, 400 dpi, 600 dpi, etc. can be set as the optical resolution. It should be noted that the optical resolution of the scanner section 1 can be set only in the main scanning direction of a scanned document (i.e., in the direction parallel to the direction in which the pixel array of the color image sensor extends).

As the moving speed of the scanner carriages 8 and 9, values such as 25%, 500%, 100% and 200% can be set. These values are determined relative to the standard speed. Like the optical resolution, the moving speed can be set only in the sub scanning direction of a scanned document (i.e., in the direction perpendicular to the direction in which the pixel array of the color image sensor 15 extends).

The sampling timings of outputs from the color image sensor 15 can be controlled in a number of ways. That is, all pixels output from the color image sensor 15 may be sampled. Alternatively, they may be sampled, with one pixel removed, or with the same pixel subjected to the sampling twice. This control of the samplings determines the resolution in the main scanning direction of the document to be scanned. If necessary, the sampling can be controlled in such a manner that it determines the resolution in the sub scanning direction of the document to be scanned.

The image processing section 131 produces C, M and Y image data by executing the color conversion to R, G, B data, the magnification control, spatial filtering, γ conversion, and half tone processing. For example, the image processing section 131 is made up of a color conversion section 141, a magnification control section 142, a spatial filter section 143, a γ-conversion section 144 and a halftone processing section 145, as shown in FIG. 4.

Figure 4:
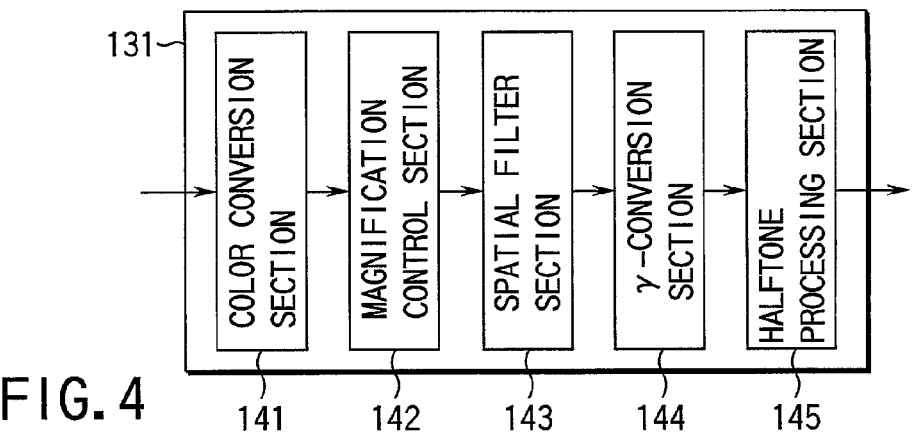
FIG. 4 is a block diagram schematically showing the image processing section depicted in FIG. 3.

Referring to FIG. 4, R, G and B image data output from the color scanner section 1 are supplied to the color conversion section 141, by which they are converted into C, M and Y image data. The image data output from the color conversion section 141 are subjected to magnification control by the magnification control section 142, and then to spatial filtering by the spatial filter section 143. Thereafter, γ conversion is executed by the γ conversion section, and half tone processing by the halftone processing section 145. After these kinds of processing, the image data are supplied to the image synthesis section 134.

The image generation section 133 generates a predetermined image on the bass of the input conditions which the CPU 132 determines for the color scanner section 1, i.e., on the basis of the optical resolution and the read magnification (for example, the moving speed of the scanner carriages 8 and 9, the sampling timings of outputs from the color image sensor 15). The image generation section 133 is made up of an address generation section 151, a character font ROM 152, an image pattern memory 153 (a ROM or a RAM), and an image memory 154, as shown in FIG. 5.

Figure 5:
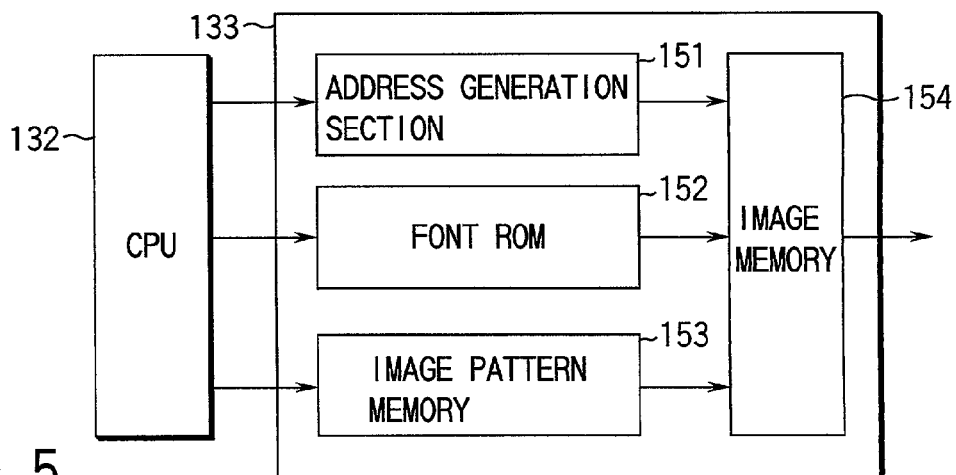
FIG. 5 is a block diagram schematically showing the image generation section depicted in FIG. 3.

Referring to FIG. 5, when an optical resolution of, for example, 400 dpi is selected from among "200 dpi", "300 dpi", "1400 dpi", "600 dpi", the CPU 132 controls the font ROM 152 to output character fonts corresponding to "resolution 400 dpi", and further controls the address generation section 151 to generate memory addresses based on which characters are to be developed in the image memory 154. On the basis of the image memory addresses generated by the address generation section 151, the image data output from the font ROM 152 are developed in the image memory 154 (which means that the image data is stored in the dot image data format).

In a manner similar to that described above, an image indicating the moving speed of the scanner cartridges 8 and 9 and the sampling timings of outputs from the color image sensor, etc. are developed in the image memory 154. FIG. 6A shows an example of an image P1 developed in the image memory and indicating the scanner input conditions. In FIG. 6A, the broken lines show the developed image region. The conditions indicated by the image are data the CPU 132 calculates on the basis of the copying magnification, the size of a sheet, the size of a document, etc. which are designated by the operator by use of the control panel.

The image pattern memory 153 outputs the scanner input conditions not with character fonts but in the form of identification patterns representing the input conditions. For example, the image shown in FIG. 6B is output. In the example shown in FIG. 6B, the optical resolution, the moving speed of the scanner cartridges 8 and 9, and the sampling timings of outputs from the color image sensor 15 are represented in the form of 4×4 black and while checker patterns. The positions of the black and white squares are determined in accordance with the input conditions. Needless to say, the input conditions are not limited to n×n black and while checker patterns, and may be bar codes or any other recognizable patterns.

The image synthesis section 134 synthesizes an output image of the image processing section 131 with an image generated by the image generation section 133, and outputs the resultant synthesized image. For example, the image synthesis section 134 is made up of an address generation section 161 and an image selection section 162, as shown in FIG. 7.

The address generation section 161 generates addresses indicating the synthesis position of an output image from the image processing section 131 and the synthesis position of an output image from the image generation section 133. The CPU 132 designates the synthesis positions of the images and informs the address generation section 161 of the designated synthesis positions. On the basis of the image address signals output from the address generation section 161, the image selection section 162 selects either the output image from the image processing section 131 or the output synthesized image.

Figure 8A:
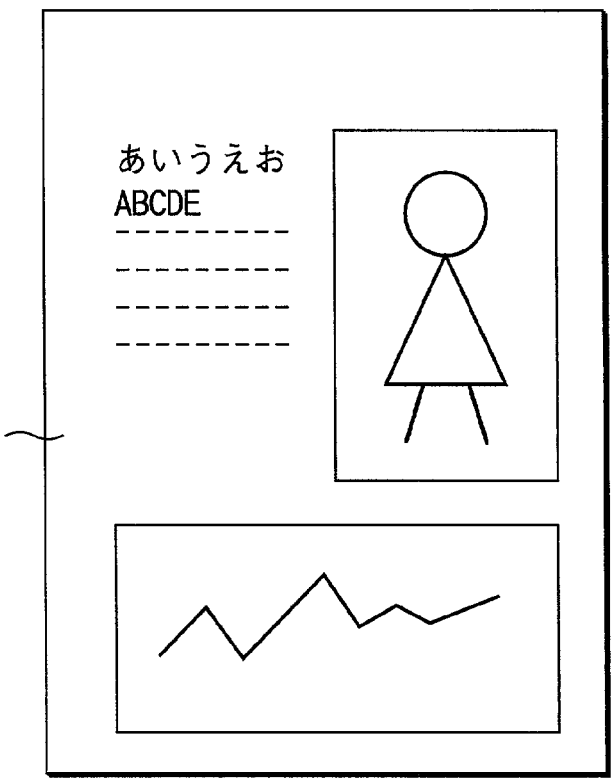
FIGS. 8A and 8B illustrate how the image synthesis section depicted in FIG. 3 operates.
Figure 8B:
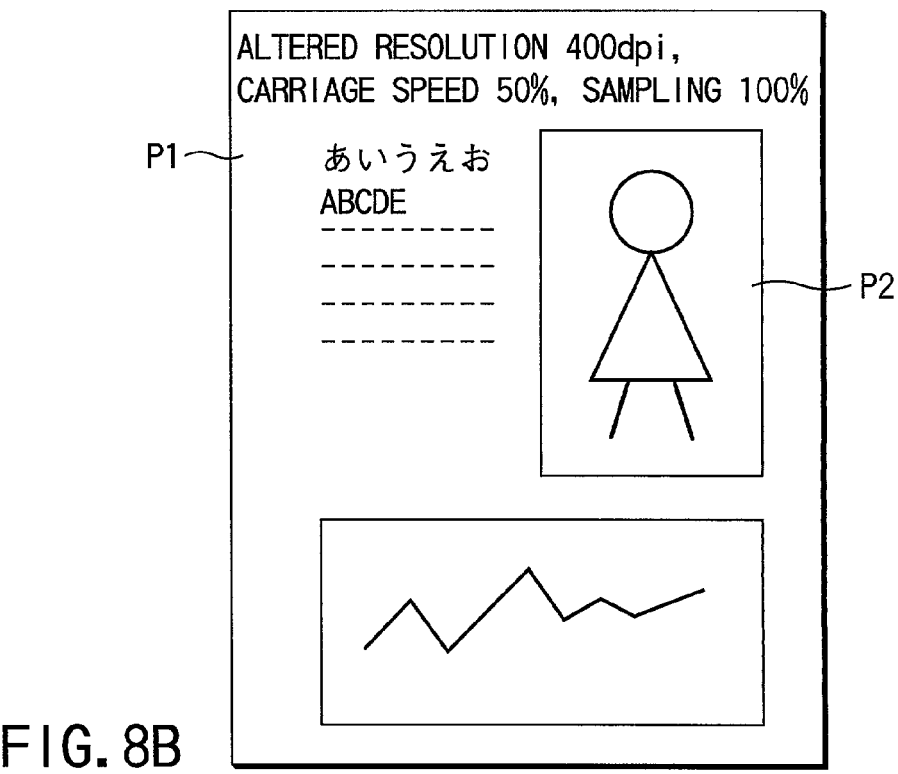

FIGS. 8A and 8B illustrate how images are synthesized together. FIG. 8A shows an output image P2 from the image processing section 131, while FIG. 8B shows an image obtained by synthesizing the image shown in FIG. 8A with an image output from the image generation section 133, such as the image P1 shown in FIG. 6A. In the example shown in FIG. 8B, the image P1 is arranged in the uppermost portion of the output image P2. Needless to say, the arrangement position is not limited to this, and may be arbitrarily determined. If the image P1 and the image P2 overlap with each other when they are synthesized together, the image P1 may be reduced in size.

The color printer section 2 prints out a synthesized image output from the image synthesis section 134 (e.g., the image shown in FIG. 8B).

Figure 9:
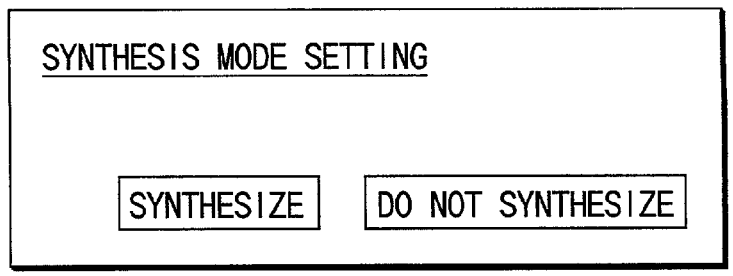
FIG. 9 illustrates how the mode designation section depicted in FIG. 3 operates.

The image synthesis operation described above can be controlled by operating the mode designation section 135 shown in FIG. 3. For example, the mode setting menu shown in FIG. 9 can be displayed on the liquid crystal display 42 of the control panel 40, so as to enable the user to choose whether or not the image synthesis should be performed. If the user selects "DO NOT SYNTHESIZE" in the menu shown in FIG. 9, the CPU 132 controls the image selection section 162 in such a manner that the image synthesis section 134 selects and outputs only the output image from the image processing section 131.

As described above, the mode designation section 135 enables the user to freely designate whether data (such as characters or a pattern image) representing the input conditions of the color scanner section 1 should be synthesized with an image to be printed out.

In the above description, reference was made to the case where an image representing the input conditions of the color scanner section 1 was prepared by the image generation section 133 and synthesized with an image to be printed out. In a similar manner, an image representing the output conditions of the color printer section 2 may be prepared and synthesized with an image to be printed out.

As in the case of the color scanner section 1, an output resolution is included among the output conditions of the color printer section 2. In addition to that output resolution, the recording system of the color printer section 2 may be represented by character fonts or in the form of an identification pattern, and output. For example, in the case of an electrophotographic printer, the laser beam modulation method (pulse width modulation or intensity modulation), the output modulation pixel unit (one-pixel modulation or two-pixel modulation), the multi-valued modulation number of a laser beam, etc. may be included in the data to be printed out.

In addition, both an image representing the input conditions of the color scanner section 1 and an image representing the output conditions of the color printer section 2 can be synthesized with an image to be printed out.

A description will now be given of the second embodiment of the present invention.

In describing the first embodiment, reference was made to the case where images representing the input conditions of the color scanner section 1 and the output conditions of the color printer section 2 were synthesized with an image to be printed out. In regard to the color printer section 2, however, not only the information on the output conditions but also the information on the recording characteristics are important since the recording characteristics are closely related to the quality of the output image. According to the second embodiment, a test pattern image representing the recording characteristics of the color printer section 2 is synthesized with an image on a document at the time of printing. A description will be given as to how this is performed.

Figure 10:
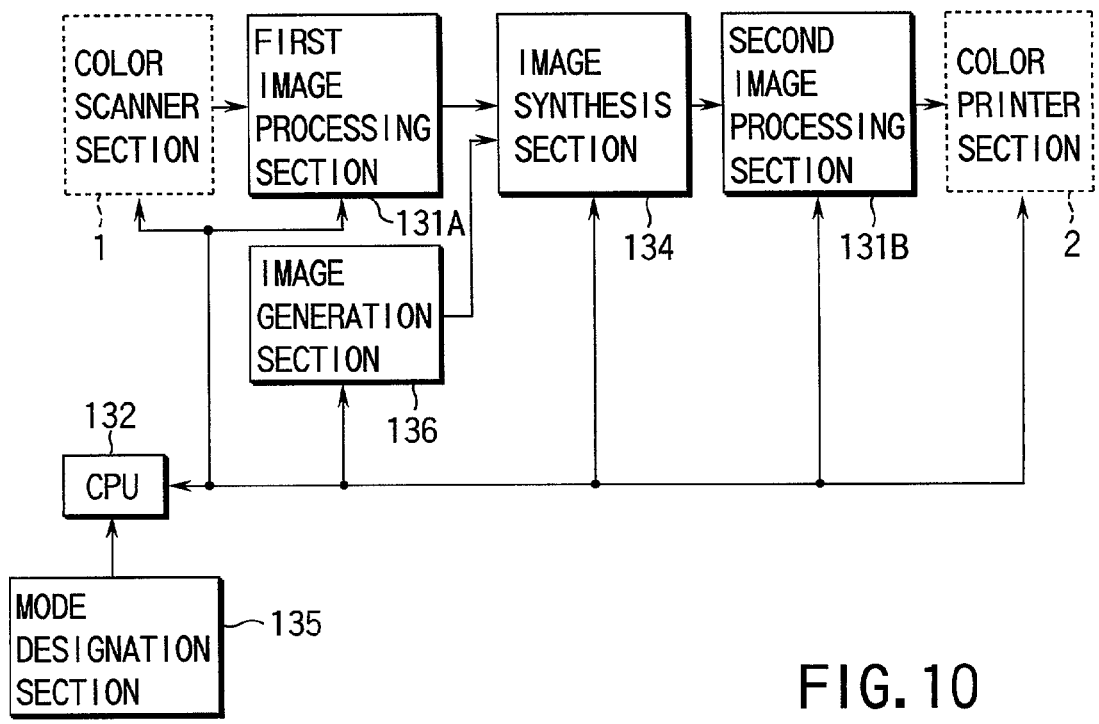
FIG. 10 is a block diagram schematically showing how images are processed in the second embodiment of the present invention.

FIG. 10 schematically illustrates the image processor 36 employed in the second embodiment. In FIG. 10, the same reference numerals as used in FIG. 3 denote similar or corresponding structural elements.

A schematic structure of the image processor 36 will be first described. Image data R, G and B output from a color scanner section 1 are first supplied to an image processing section 131A. The image processing section 131A performs predetermined image processing for the R, G and B image data output from the color scanner section 1.

An image generation section 136 generates a test pattern image designated by a CPU 132. An image synthesis section 134 synthesizes an output image of the first image processing section 131A with the image generated by the image generation section 136.

A second image processing section 131B performs predetermined image processing with respect to the synthesized image output from the image synthesis section 134. The processed image is supplied to a color printer section 2. The color printer section 2 prints out the processed image received from the second image processing section 131B.

By operating a mode designation section 135, the user can designate the operating conditions of the image generation section 133 and the image synthesis section 134.

Each of these structural components will be described in more detail.

Figure 11:
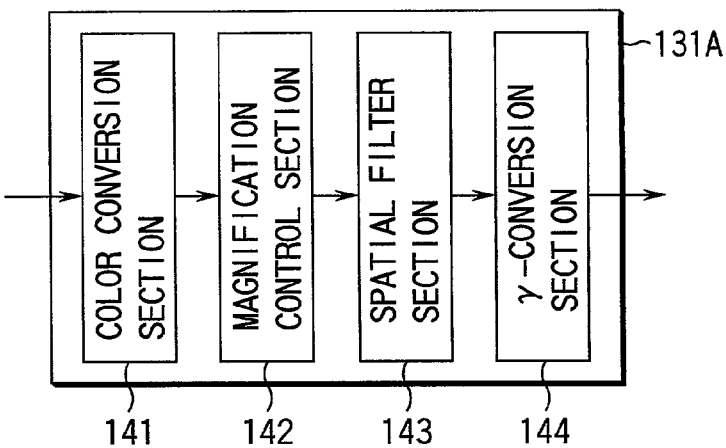
FIG. 11 is a block diagram schematically showing the first image processing section depicted in FIG. 10.

The color scanner section 1 outputs R, G and B image data, as described above, and the first image processing section 131A performs predetermined processing with respect to the R, G, and B image data output from the color scanner section 1. Of the image processing shown in FIG. 4, the first image processing section 131A performs those kinds of processing which are not much related to the recording characteristics of the color printer section 2. For example, the first image processing section 131A executes color conversion, magnification control, spatial filtering, and γ conversion, and is therefore made up of a color conversion section 141, a magnification control section 142, a spatial filter section 143 and a γ-conversion section 144 as shown in FIG. 11.

The image generation section 136 generates a test pattern image. For example, the image generation section 136 is made up of an address generation section 171, an image pattern memory 172 and an image memory 173, as shown in FIG. 12.

Of the image patterns stored in the image pattern memory 172, the CPU 132 designates one or some of the image patterns. In addition, the CPU 132 controls the address generation section 171 to generate memory addresses based on which the selected image patterns are developed in the image memory 173. On the basis of the image memory addresses output from the address generation section 171, the image data output from the image pattern memory 172 are developed in the image memory 173.

The image patterns stored in the image pattern memory 172 include those which enable the user to understand and evaluate the recording characteristics of the color printer section 2. For example, patterns representing the characteristics related to the resolution of the color printer section 1, such as those shown in FIGS. 13A–13E, are stored in the image pattern memory 172. The pattern in FIG. 13A is a checker pattern, that in FIG. 13B is an isolated pattern, that in FIG. 13C is a lattice pattern, and that in each of FIGS. 13D and 13E is millions of short lines pattern. (In FIGS. 13A–13E, black and white binary-valued patterns are shown. Each square represents one pixel, and a square indicated with the oblique lines represents a black pixel.) The image pattern memory 172 also stores a gradation pattern representing the gradation characteristics of the color printer section 2, such as the gradation pattern shown in FIG. 14. In FIG. 14, each of the gradation blocks is comprised of n×m pixels and is expressed with an image density corresponding to one of the indicated 8-bit numerals (0 to 255). Any combination of the gradation patterns can be freely combined together by the CPU 132.

The image synthesis section 134 synthesizes an output image of the first image processing section 131A with an image generated by the image generation section 136, and outputs the resultant synthesized image. For example, the image synthesis section 134 is made of such a circuit as is shown in FIG. 7. Since the circuit shown in FIG. 7 was already described above, a repeated description will be omitted herein.

Figure 15:
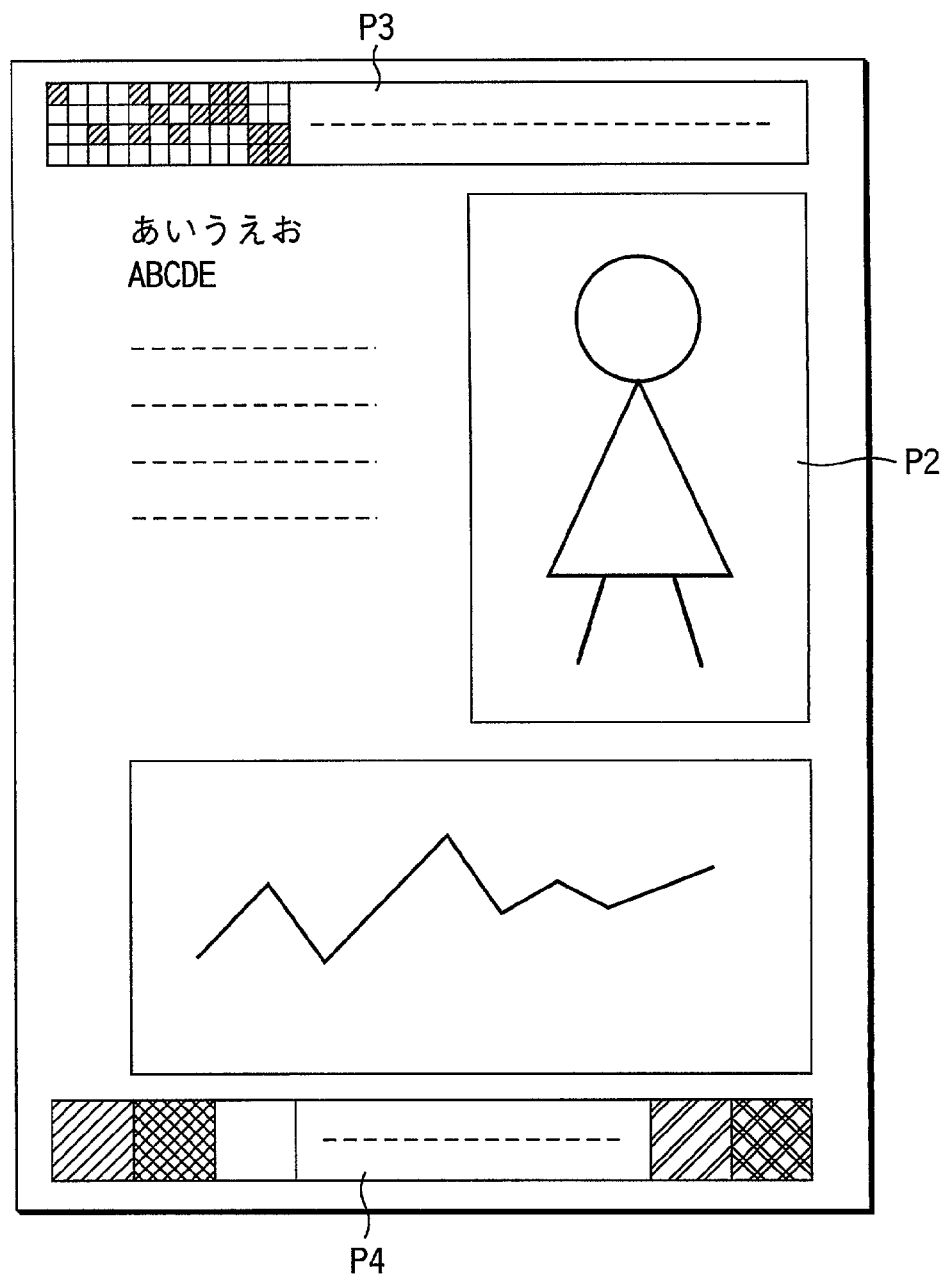
FIG. 15 illustrates how the image synthesis section depicted in FIG. 10 operates.

FIG. 15 shows an example of an output synthesized image. The output image from the first image processing section 131A is the same image as shown in FIG. 8A, which was described above. The image obtained by synthesizing that output image with an image output from the image generation section 136 is the image shown in FIG. 15. In the example shown in FIG. 15, the pattern P4 related to the gradation characteristics is arranged at the bottom of the output image P2. Needless to say, the arrangement position is not limited to this, and may be arbitrarily determined.

The second image processing section 131B performs gradation processing with respect to the image output from the image synthesis section 134. The gradation processing using the error diffusion method or organizational dither method is performed, for example.

The color printer section 2 prints out the synthesized image (such as that shown in FIG. 15) output from the second image processing section 131B.

The operation described above can be controlled by operating the mode designation section 135 shown in FIG. 10. In other words, the user can choose whether or not the pattern image synthesis should be performed, by operating the mode designation section 135.

A description will now be given of the third embodiment of the present invention.

According to the third embodiment, data on the processing conditions of an image processor are synthesized with an image of a document and output, and the data on the processing conditions are stored and managed. Features of the third embodiment will be described.

Figure 16:
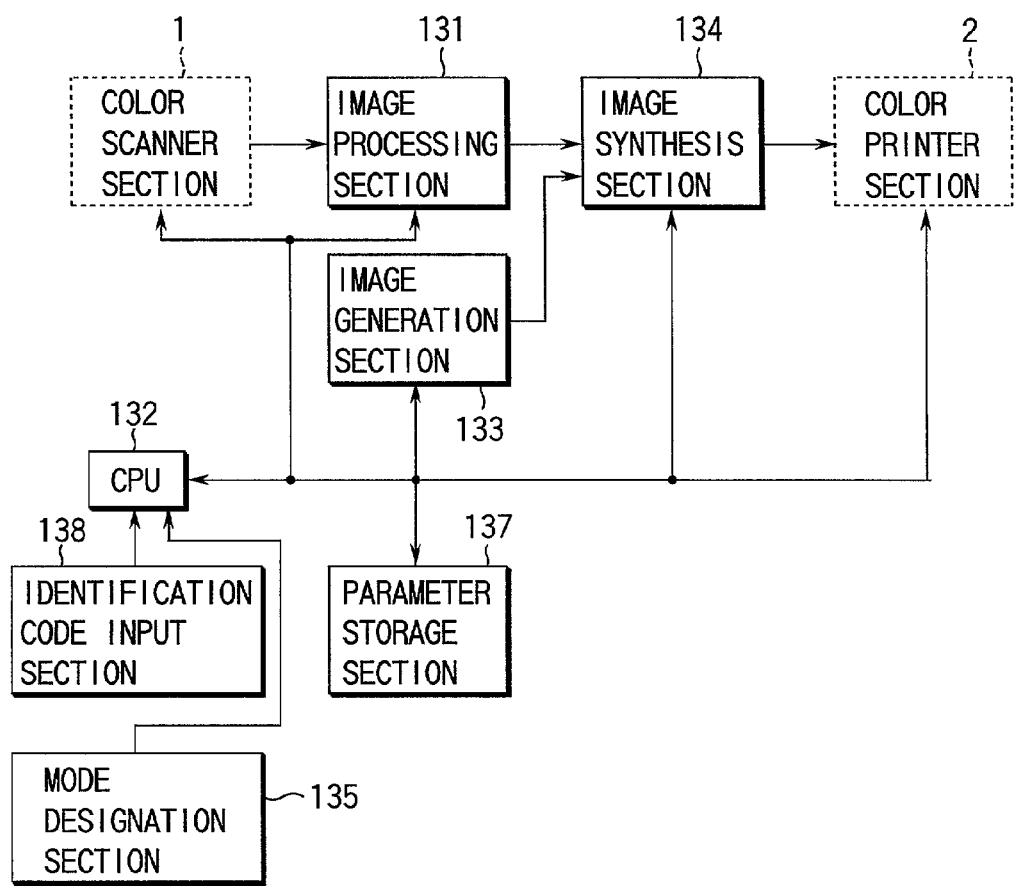
FIG. 16 is a block diagram schematically showing how images are processed in the third embodiment of the present invention.

FIG. 16 schematically illustrates the image processor 36 employed in the third embodiment. In FIG. 16, the same reference numerals as used in FIG. 3 denote similar or corresponding structural elements.

A schematic structure of the image processor 36 will be first described. Image data R, G and B output from a color scanner section 1 are first supplied to an image processing section 131. The image processing section 131 performs predetermined image processing for the R, G and B image data output from the color scanner section 1.

An image generation section 133 generates a predetermined image on the basis of the image processing conditions which a CPU 132 determines for the image processing section 131. The image processing conditions determined for the image processing section 131 are stored in a parameter storage section 137. An image synthesis section 134 synthesizes an output image of the image processing section 131 with the image generated by the image generation section 133. The resultant synthesized image is supplied to a color printer section 2. The color printer section 2 prints out the synthesized image received from the image synthesis section 134.

An identification code input section 138 supplies an identification code to the CPU 132. The CPU 132 sets the image processing section 131 in accordance with the image processing conditions corresponding to the identification code received from the identification code input section 138.

By operating a mode designation section 135, the user can designate the operating conditions of the image generation section 133 and the image synthesis section 134. In addition, the user can designate whether the image processing section 131 should be controlled in accordance with the processing conditions that correspond to the identification code supplied from the identification code input section 138.

Each of these structural components will be described in more detail.

The color scanner section 1 outputs R, G and B image data, as described above, and the image processing section 131 performs predetermined processing with respect to the R, G, and B image data output from the color scanner section 1. The image processing section 131 has such structural components as are shown in FIG. 4, as described above, and executes color conversion, magnification control, spatial filtering, and γ conversion, and halftone processing. The operation of the first processing section 131 of the third embodiment is similar to that of the first processing section 131 of the first embodiment.

The CPU 132 sets processing parameters to be used in the image processing section 131, including a color conversion section 141, a magnification control section 142, a spatial filter section 143, a γ-conversion section 144 and a halftone processing section 145. In the case where the color conversion section 141 is a masking matrix type, the processing parameter set for it is a matrix coefficient. In the case where it is a lookup table (LUT) type, the parameter set for it is a table parameter. The parameter set for the spatial filter section 143 is a filter coefficient, and the parameter set for the γ-conversion section 144 is a γ value or a γ table value. In regard to the halftone processing section 145, there are a number of kinds of parameters that are set for it. That is, a processing method, the number of multi-valued levels, and other various conditions are expressed as processing parameters.

The image generation section 133 has such structural components as are shown in FIG. 5, as described above. The image generation section 133 generates character fonts by using the processing parameters the CPU 132 sets for the image processing section 131, without executing any particular processing thereto. Alternatively, the image generation section 133 generates character fonts by translating the processing parameters into identification codes, and outputting the identification codes. The operation of the image generation section 133 of the third embodiment is similar to that of the image generation section 133 of the first embodiment.

The image synthesis section 134 synthesizes an output image of the image processing section 131 with an image generated by the image generation section 133, and outputs the resultant synthesized image. For example, the image synthesis section 134 is made of such a circuit as is shown in FIG. 7. Since the circuit shown in FIG. 7 was already described above, a repeated description will be omitted herein.

The color printer section 2 prints out the synthesized image received from the image synthesis section 134. The parameter storage section 137 can be made of any one of various types of storage media and storage devices, including a semiconductor memory, a hard disk device (HDD), an optical disk device, a personal computer, a work station, etc.

In the case where the image generation section 133 generates image processing parameters in the form of identification codes (to be described later), the identification codes and the associated image processing parameters are stored in the parameter storage section 137.

Where the image generation section 133 generates a set of image processing parameters in the form of identification codes, a table such as that shown in FIG. 17 is prepared. In the example shown in FIG. 17, combinations of the image processing parameters set for the color conversion, the spatial filter, etc. are associated with identification codes such as "00001", "00002", "00003", etc., in such a manner that each combination corresponds to one identification code. It should be noted that there is a one-to-one correspondence between the combinations of image processing parameters and the identification codes. Needless to say, the identification codes can be utilized in a different manner from that described above. That is, identification codes "00001", "00002", "00003", etc. may be sequentially assigned each time the image processing apparatus of the invention outputs a synthesized image by use of different parameters from the last ones. In addition, the identification codes may be associated with image patterns other than numbers. In this way, the identification codes can be utilized in various manners.

According to the third embodiment, the image generation section 133 generates dot images such as "00001", "00002", "00003" by using the character fonts, and stores them. The parameter storage section 137 stores and manages a table made up of a set of code data, such as those shown in FIG. 17. In other words, the parameter storage section 137 stores and manages how the identification codes "00001", "00002", "00003", etc. are associated with combinations of the image processing parameters, including "parameter A", "parameter B", "parameter a", "parameter b", etc. The table shown in FIG. 17 may be indicated on the control panel 40 or on the display of a personal computer connected to the present image processor. The table can be printed out by the printer section 2.

The identification code input section 138 displays an identification code input/setting menu on the liquid crystal display 42 of the control panel 40, and enables the user to enter an identification code, as shown in FIG. 18. On the basis of the entered identification code, the CPU 132 search the parameter storage section 137 for the corresponding image processing parameters. The image processing section 131 is set in accordance with the image processing parameters searched for. As can be seen from this, if a printed image has an identification code, the image can be processed again under the same image processing conditions by merely entering that identification code.

As described above, the identification code input section 138 can display an identification code input/setting menu on the liquid crystal display 42 of the control panel 40, enabling the user to enter an identification code. In place of this structure, the identification code input section 138 can be realized as an input device provided separately from the present image processor. For example, a personal computer, a work station, a keyboard, or another type of input device can be connected to the subject image processor and used as the identification code input section 138.

In the above description, reference was made to the case where the parameter storage section 137 stores image processing parameters of the image processing section 131. Needless to say, the parameter storage section 137 can store the input conditions of the color scanner section 1 and the output conditions of the color printer section 2 as well. If this is done, the user is only required to enter an identification code so as to output an image of the same quality. That is, not only the image processing parameters but also the input conditions of the color scanner section 1 and the output conditions of the color printer section 2 are searched for in response to the entry of the identification code, and the image is produced and output based on the parameters and conditions searched for.

Connection interfaces for the identification code input section 138 and the parameter storage section 137 may be provided. If such interfaces are employed, the identification code input section 138 and the parameter storage section 137 can be connected or disconnected from the present image processor in accordance with the necessity.

As described above in detail, according to the present invention, when an image is output, an image or an identification code that represents the operating conditions of the present apparatus, including the image input conditions, the image processing conditions and the image output conditions, is synthesized with the output image. Since the state in which the image is output (i.e., the image input conditions, the image processing conditions, the image output conditions) is thus clear, the serviceperson does not have to rely on his or her experience to locate the cause of image quality degradation. In addition, the serviceperson need not repeatedly output a copy of an image for the location of the cause of the image quality degradation, thereby reducing the quantities in which consumables, such as paper and toner, are used. The check the serviceperson performs for the location of the cause of the image quality degradation can be executed within a short time, thereby minimizing the service cost.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image forming apparatus comprising:
an input unit which inputs an image inputting condition of the apparatus;
a scanner which reads a document on a basis of the image inputting condition input by the input unit and provides image data on the document as first image data;
an image processing unit which processes the first image data provided by the scanner;
a printer which forms an image on a sheet of paper corresponding to input image data processed by the image processing unit;
an operating condition image producing unit which produces image data of a character string as second image data, indicative of operating conditions which determine image quality of the apparatus and include the image inputting condition input by the input unit;
a synthesizing unit which synthesizes the first image data read by the scanner and processed by the image processing unit with the second image data produced by the operating condition image producing unit;
a control unit which controls the printer to form an image corresponding to the first and second image data synthesized by the synthesizing unit on the sheet of paper;
a designating unit which designates whether or not the first image data obtained by the image processing unit should be synthesized with the second image data produced by the operating condition image producing unit; and
said synthesizing unit synthesizes the first image data obtained by the image processing unit with the second image data produced by the operating condition image producing unit and provides resultant synthesized image data in a case where the designating unit designates synthesis and provides only the first image data obtained by the image processing unit in other cases.

2. An image forming apparatus according to claim 1, wherein said operating condition image producing unit includes a resolution and sampling rate indicative unit which produces an image data indicative of a resolution and sampling rate of the scanner.

3. An image forming apparatus according to claim 1, wherein said operating condition image producing unit includes an output conditions indicative unit which produces an image data indicative of output conditions of the image forming unit.

4. An image forming apparatus according to claim 1, wherein said operating condition image producing unit includes a processing conditions indicative unit which produces an image data indicative of processing conditions of the image processing unit.

* * * * *